United States Patent
Choi et al.

(10) Patent No.: US 12,133,068 B2
(45) Date of Patent: Oct. 29, 2024

(54) ELECTRONIC DEVICE AND CONTROL METHOD THEREFOR

(71) Applicant: Samsung Electronics Co., Ltd., Suwon-si (KR)

(72) Inventors: Suk Won Choi, Suwon-si (KR); Hyun Jae Shin, Suwon-si (KR); Dong Yun Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 406 days.

(21) Appl. No.: 17/288,717

(22) PCT Filed: Oct. 29, 2019

(86) PCT No.: PCT/KR2019/014372
§ 371 (c)(1),
(2) Date: Apr. 26, 2021

(87) PCT Pub. No.: WO2020/091382
PCT Pub. Date: May 7, 2020

(65) Prior Publication Data
US 2021/0400477 A1 Dec. 23, 2021

(30) Foreign Application Priority Data
Nov. 2, 2018 (KR) ........................ 10-2018-0133602

(51) Int. Cl.
*H04W 12/06* (2021.01)
*H04W 4/80* (2018.01)
(Continued)

(52) U.S. Cl.
CPC ......... *H04W 12/06* (2013.01); *H04W 12/037* (2021.01); *H04W 12/08* (2013.01); *H04W 12/63* (2021.01); *H04W 4/80* (2018.02)

(58) Field of Classification Search
CPC ....... H04W 12/06; H04W 12/08; H04W 4/80; H04W 84/12; H04W 4/02; H04W 48/16;
(Continued)

(56) References Cited

U.S. PATENT DOCUMENTS 10,524,299 B1 * 12/2019 Williams .............. H04W 76/11
2008/0102798 A1 * 5/2008 Fujimoto ................ H04L 63/06
455/411

(Continued)

FOREIGN PATENT DOCUMENTS

JP 2017-511553 A 4/2017
KR 10-2015-0033515 A 4/2015
(Continued)

OTHER PUBLICATIONS

International Search Report dated Mar. 5, 2020, issued in International Application No. PCT/KR2019/014372.
(Continued)

*Primary Examiner* — Kwasi Karikari
(74) *Attorney, Agent, or Firm* — Jefferson IP Law, LLP (57) ABSTRACT

The present invention relates to an electronic device and a method of controlling the same, and more specifically, to a network configuration technology for electronic devices to be registered in a home network system. An electronic device according to one embodiment includes a communicator configured to perform data communication with a new electronic device which is not registered in an access point (AP), a storage which stores authentication information for accessing the AP, and a controller configured to, when the controller receives device identification information of the new electronic device through the communicator, control the communicator to transmit the authentication information,
(Continued)

which allows the new electronic device to access the AP, to the new electronic device based on the received identification information.

13 Claims, 8 Drawing Sheets

(51) Int. Cl.
*H04W 12/037* (2021.01)
*H04W 12/08* (2021.01)
*H04W 12/63* (2021.01)

(58) Field of Classification Search
CPC ... H04W 4/029; H04W 12/069; H04W 76/10; H04W 88/08; H04W 12/068; H04W 76/11; H04W 12/02; H04W 88/02; H04W 4/021; H04W 48/08; H04W 4/023; H04W 64/00; H04W 48/18; H04W 8/18; H04W 84/045; H04W 36/08; H04W 48/20; H04W 12/63; H04W 84/18; H04W 48/02; H04W 8/005; H04W 12/50; H04W 88/16; H04W 48/10; H04W 12/062; H04W 4/025; H04W 64/003; H04W 76/12; H04W 12/03; H04W 4/24; H04W 36/14; H04W 4/21; H04W 12/0431; H04W 8/20; H04W 88/04; H04W 4/20; H04W 12/10; H04W 12/33; H04W 12/37; H04W 48/04; H04W 12/64; H04W 36/0011; H04W 74/002; H04W 16/14; H04W 12/40; H04W 4/33; H04W 72/51; H04W 12/75; H04W 76/20; H04W 12/30; H04W 8/186; H04W 76/19; H04W 12/73; H04W 40/20; H04W 8/245; H04W 12/0471; H04W 84/047; H04W 74/06; H04W 84/20; H04W 40/248; H04W 12/043; H04W 72/27; H04W 74/0891; H04W 12/48; H04W 28/16; H04W 36/245; H04W 56/00; H04W 36/26; H04W 40/22; H04W 28/12; H04W 76/00; H04W 12/60; H04W 12/76; H04W 36/10; H04W 16/225
See application file for complete search history.

(56) References Cited

U.S. PATENT DOCUMENTS

| | | |
|---|---|---|
| 2013/0173811 A1 | 7/2013 | Ha et al. |
| 2015/0121470 A1 | 4/2015 | Rongo et al. |
| 2017/0085698 A1 | 3/2017 | Lee et al. |
| 2018/0124050 A1* | 5/2018 | Sakamoto ............. G06F 21/445 |
| 2018/0167392 A1 | 6/2018 | Zakaria |
| 2018/0183874 A1 | 6/2018 | Cook |

FOREIGN PATENT DOCUMENTS

| | | |
|---|---|---|
| KR | 10-2016-0068406 A | 6/2016 |
| KR | 10-2018-0086118 A | 7/2018 |

OTHER PUBLICATIONS

Korean Office Action dated Nov. 15, 2022, issued in Korean Application No. 10-2018-0133602.

* cited by examiner

ELECTRONIC DEVICE AND CONTROL METHOD THEREFOR

TECHNICAL FIELD

The present invention relates to an electronic device and a method of controlling the same, and more specifically, to a network configuration technology for electronic devices to be registered in a home network system.

BACKGROUND ART

Although the Internet was basically developed so that computers, which are used by humans, communicate with each other through a Transmission Control Protocol (TCP)/Internet Protocol (IP) protocol, studies have been recently carried out to allow things capable of performing identification, arithmetic operation, and communication to communicate with each other through the Internet. A technology allowing the things to perform the communication is referred to as an Internet of Things (hereinafter, referred to as "IoT") technology.

As electronic devices supporting wireless network functions in relation to such IoT devices are widely provided, requirements for home network configuration are increasing. Particularly, as the digital age actively progresses and home appliances (for example, washing machines, refrigerators, and air conditioners) in homes or buildings are changed into high-speed digital home appliances that perform high-speed and large-capacity transmission, systems are being developed in which networks are established between the home appliances and which integrally manage the networks.

In such a network system, a wireless fidelity (Wi-Fi) module is mounted on the home appliance, and a wireless access point (AP) which is connected to the Wi-Fi module and connects the home appliance to the external Internet is installed.

A user should register a plurality of electronic devices provided in the home in a wireless router such as the AP in order to use the plurality of electronic devices through a home network. Generally, a method of registering the electronic device in the AP is performed in a method of inputting authentication information including subsystem identification (SSID) and key information set in the AP through a graphic user interface (GUI) screen of the corresponding electronic device. In a case in which the electronic device does not support the GUI screen, the user should set another electronic device capable of supporting a GUI screen to be able to wirelessly communicate with the corresponding electronic device and register the electronic device which does not support the GUI screen in the AP using the other electronic device supporting the GUI screen.

However, a user who is not familiar with the registration setting of the electronic device may not register the electronic device in the AP, and thus there is a problem in that the user may not use a home network service through the electronic device provided in the home.

Recently, the importance of technology of registering an electronic device in an AP performed by an electronic device which has been registered in the AP for a user who is not familiar with registration setting of the electronic device as described above is increasing.

DISCLOSURE

Technical Problem

The present invention is directed to allowing a new electronic device, which is not registered in an access point (AP), to be registered in the AP by an electronic device which has been registered in a home network system so that various kinds of electronic devices are registered in the AP at once without user manipulation.

Technical Solution

One aspect of the present invention provides an electronic device to achieve the above-described objective.

The electronic device includes a communicator configured to perform data communication with a new electronic device which is not registered in an access point (AP), a storage which stores authentication information for accessing the AP, and a controller configured to, when the controller receives device identification information of the new electronic device through the communicator, control the communicator to transmit the authentication information, which allows the new electronic device to access the AP, to the new electronic device based on the received identification information.

The controller may compare the received identification information and prestored authentication information for accessing the AP, and when the identification information matches the authentication information, the controller may control the communicator to transmit the authentication information, which allows the new electronic device to access the AP, to the new electronic device.

The controller may compare the received identification information and prestored authentication information for accessing the AP, and when the identification information matches the authentication information, the controller may encrypt the authentication information, which allows the new electronic device to access the AP, and control the communicator to transmit the encrypted authentication information to the new electronic device.

When the controller receives a plurality of pieces of device identification information of a plurality of new electronic devices through the communicator, the controller may control the communicator to transmit a plurality of pieces of authentication information, which allow the plurality of new electronic devices to access the AP, to the plurality of new electronic devices based on the plurality of pieces of the received identification information.

When the controller receives a plurality of pieces of device identification information of a plurality of new electronic devices through the communicator, the controller may control the communicator to sequentially transmit a plurality of pieces of authentication information, which allow the plurality of new electronic devices to access the AP, to the plurality of new electronic devices according to a predetermined order based on the plurality of pieces of the received identification information.

The authentication information may include at least one of subsystem identification (SSID) and password information for the electronic device and the new electronic device to access the AP.

The device identification information may include at least one of address information and product information of the new electronic device.

The communicator may search the new electronic device positioned around the electronic device, and when the new electronic device is positioned within a predetermined distance from the electronic device, the communicator may receive the device identification information from the new electronic device.

The communicator may include an ultrasonic receiver module and search the new electronic device positioned within a predetermined distance from the electronic device based on an ultrasonic signal received from the new electronic device.

The communicator may include a Bluetooth Low Energy (BLE) module and search the new electronic device positioned within a predetermined distance from the electronic device using short-range communication of the BLE module.

The communicator may receive the authentication information for accessing the AP from a server.

Another aspect of the present invention provides a method of controlling an electronic device including Searching a new electronic device positioned around an electronic device, receiving device identification information of the new electronic device through a communicator when the new electronic device is positioned within a predetermined distance from the electronic device, and controlling the communicator to transmit authentication information, which allows the new electronic device to access an access point (AP), to the new electronic device based on the received identification information.

When the received identification information and pre-stored authentication information are compared in order to allow the new electronic device to access the AP, and the identification information matches the authentication information, the communicator may be controlled so that the authentication information is transmitted to the new electronic device.

When the received identification information and pre-stored authentication information are compared in order to allow the new electronic device to access the AP, and the identification information matches the authentication information, the communicator may be controlled so that the authentication information is encrypted and the encrypted authentication information is transmitted to the new electronic device.

When a plurality of pieces of device identification information of a plurality of new electronic devices are received through the communicator, the communicator may be controlled so that a plurality of pieces of the authentication information, which allow the plurality of new electronic devices to access the AP, are transmitted to the plurality of new electronic devices at the same time based on the plurality of pieces of the received identification information.

When a plurality of pieces of device identification information of a plurality of new electronic devices are received through the communicator, the communicator may be controlled so that a plurality of pieces of the authentication information, which allow the plurality of new electronic devices to access the AP, are transmitted to the plurality of new electronic devices based on the plurality of pieces of the received identification information.

The searching of the new electronic device positioned around the electronic device may include searching the new electronic device positioned within the predetermined distance from the electronic device based on an ultrasonic signal received from the new electronic device through an ultrasonic receiver module included in the communicator.

The searching of the new electronic device positioned around the electronic device may include searching the new electronic device positioned within the predetermined distance from the electronic device using short-range communication of a BLE module included in the communicator.

The method of controlling an electronic device may further include receiving the authentication information for accessing the AP from a server.

The method of controlling an electronic device may include performing data communication with the new electronic device which is not registered in the AP and storing the authentication information for accessing the AP.

Advantageous Effects

Since an electronic device registered in a home network system automatically performs registration of new electronic devices which are not registered in an AP, there is an effect that various electronic devices are registered in the AP at once without user manipulation.

MODES OF THE INVENTION

Like reference numerals denote like elements throughout the specification. In the specification, all elements of the embodiments are not described, and general contents in the art or repeated contents between the embodiments will not be described. Terms such as parts, modules, members, and blocks may be realized using a software or hardware, and a plurality of parts, modules, members, and blocks are realized in a single element, or one part, module, member, or block may also include a plurality of elements.

Throughout the specification, when a part is referred to as being "connected" to another part, it includes "directly connected" to another part and "indirectly connected" to another part, and the "indirectly connected" to another part includes "connected" to another part through a wireless communication network.

In addition, when a part "includes" an element, another element may be further included, rather than excluding the existence of another element, unless otherwise described.

Terms such as first, second, and the like are used herein to distinguish one element from another element, and the elements are not limited to the above-described terms.

As used herein, singular forms "a" and "an" are intended to include the plural forms as well, unless the context clearly indicates otherwise.

Reference numerals in operations are used for the sake of convenience in description and do not describe an order of the operations, and the operations may be performed through an order different from the described order unless the context clearly indicates a specific order.

Hereinafter, the operation principle and embodiments of the present invention will be described with reference the accompanying drawings.

Figure 1:
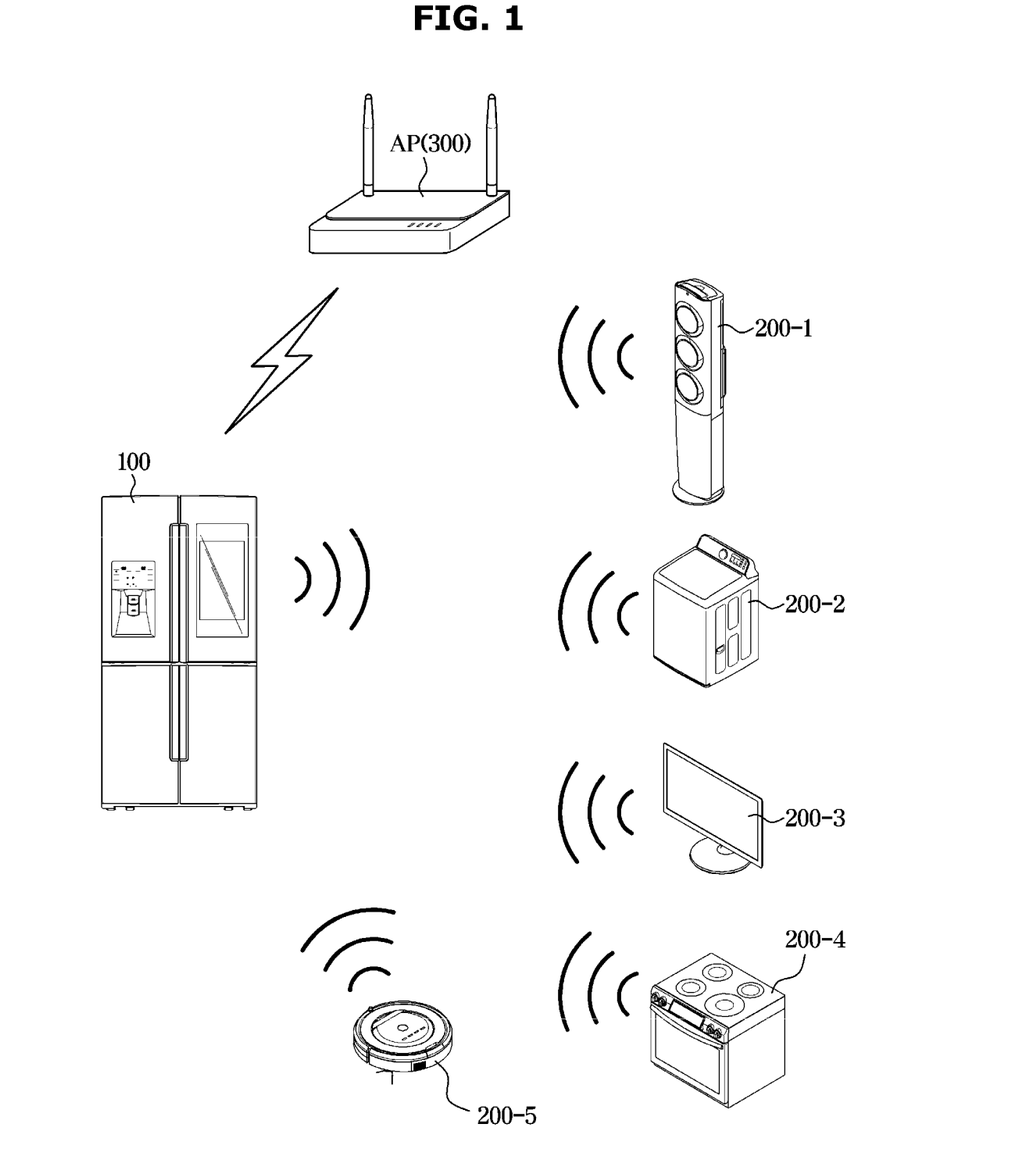
FIG. 1 is a system diagram illustrating a home network system according to one embodiment.

FIG. 1 is a system diagram illustrating a home network system according to one embodiment.

As illustrated in FIG. 1, a home network system may include at least one electronic device and a wireless access point (AP) for connecting the electronic device to the external Internet.

The electronic device according to the disclosed embodiment may include various electronic apparatuses, and hereinafter, the present invention will be described based on home appliances including various kinds of electronic products such as washing machines, refrigerators, microwaves, television sets, air conditioners, gas ranges, robot vacuum cleaners, audio systems, computers, and speakers used in homes and included in home network systems.

Such an electronic device may use a Wi-Fi module mounted thereon to be connected to the external Internet, and the home network system is a system allowing electronic devices to perform data communication with each other through an access point (AP) 300 in a home network.

Referring to FIG. 1, in the home network system, an electronic device 100 registered in the AP 300 and electronic devices 200 (200-1 to 200-5) to be newly registered in the AP 300 may perform data communication with each other through the AP 300.

In a case in which the electronic device 100 registered in advance in the AP 300 is a refrigerator, in order to use the other electronic devices 200 provided in a home in the home network, the new electronic devices 200 should be registered in the AP 300.

In one embodiment of the disclosed invention, as illustrated in FIG. 1, a method will be described in which the electronic device 100, which is registered in advance, detects the new electronic devices 200 and registers the new electronic devices 200 in the AP 300 according to a predetermined procedure in a case in which the new electronic devices 200 are added to be registered in the home network system.

In FIG. 1, an example will be described in which the electronic device 100, which is registered in advance, is a refrigerator, and the plurality of electronic devices, which are newly added to the home network system, are an air conditioner 200-1, a washing machine 200-2, a television set (TV) 200-3, a gas range 200-4, and a robot cleaner 200-5, but the present invention is not limited to the registered electronic device and kinds of new electronic devices which will be newly registered.

Figure 2:
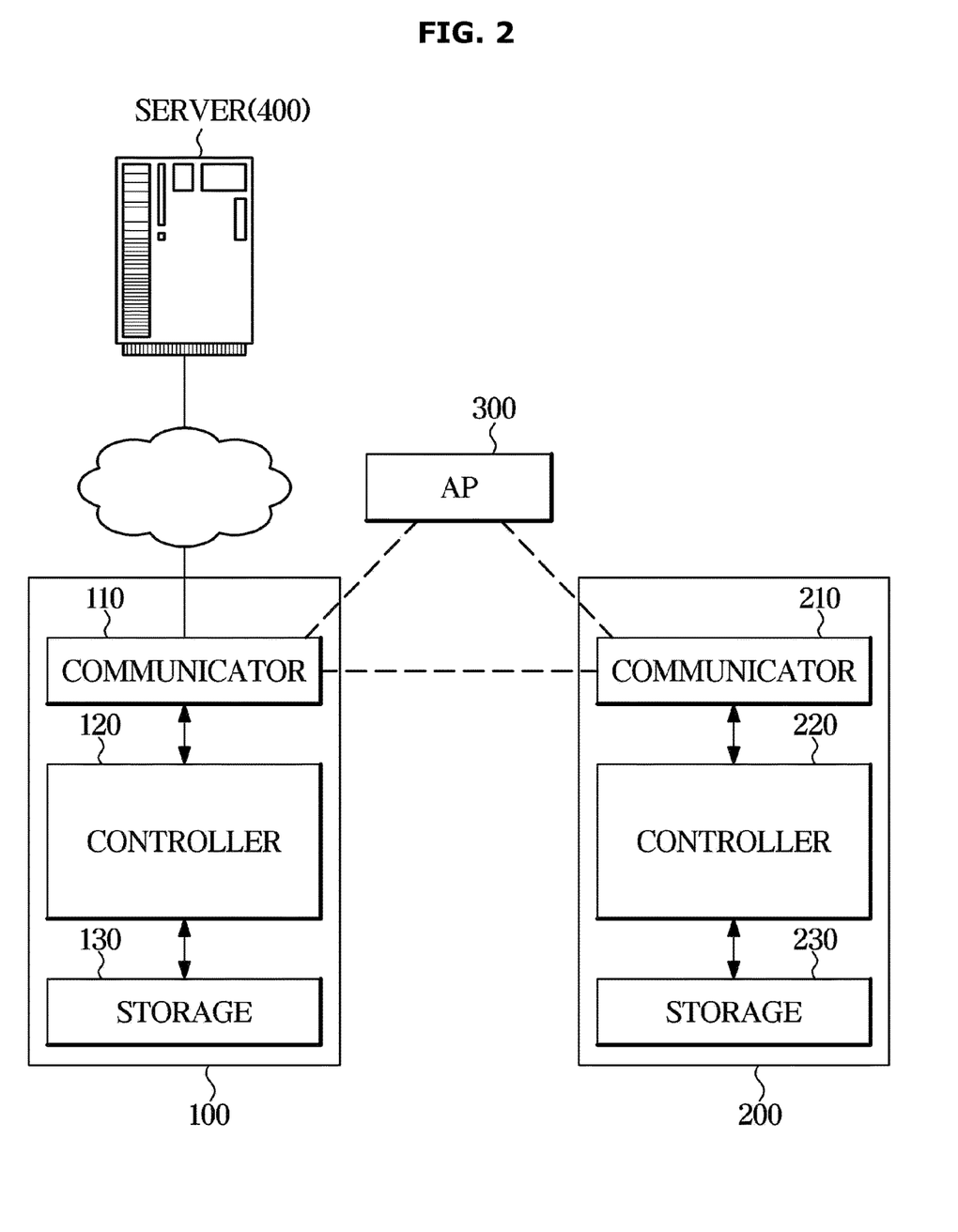
FIG. 2 is a control block diagram of an electronic device according to one embodiment.
Figure 3:
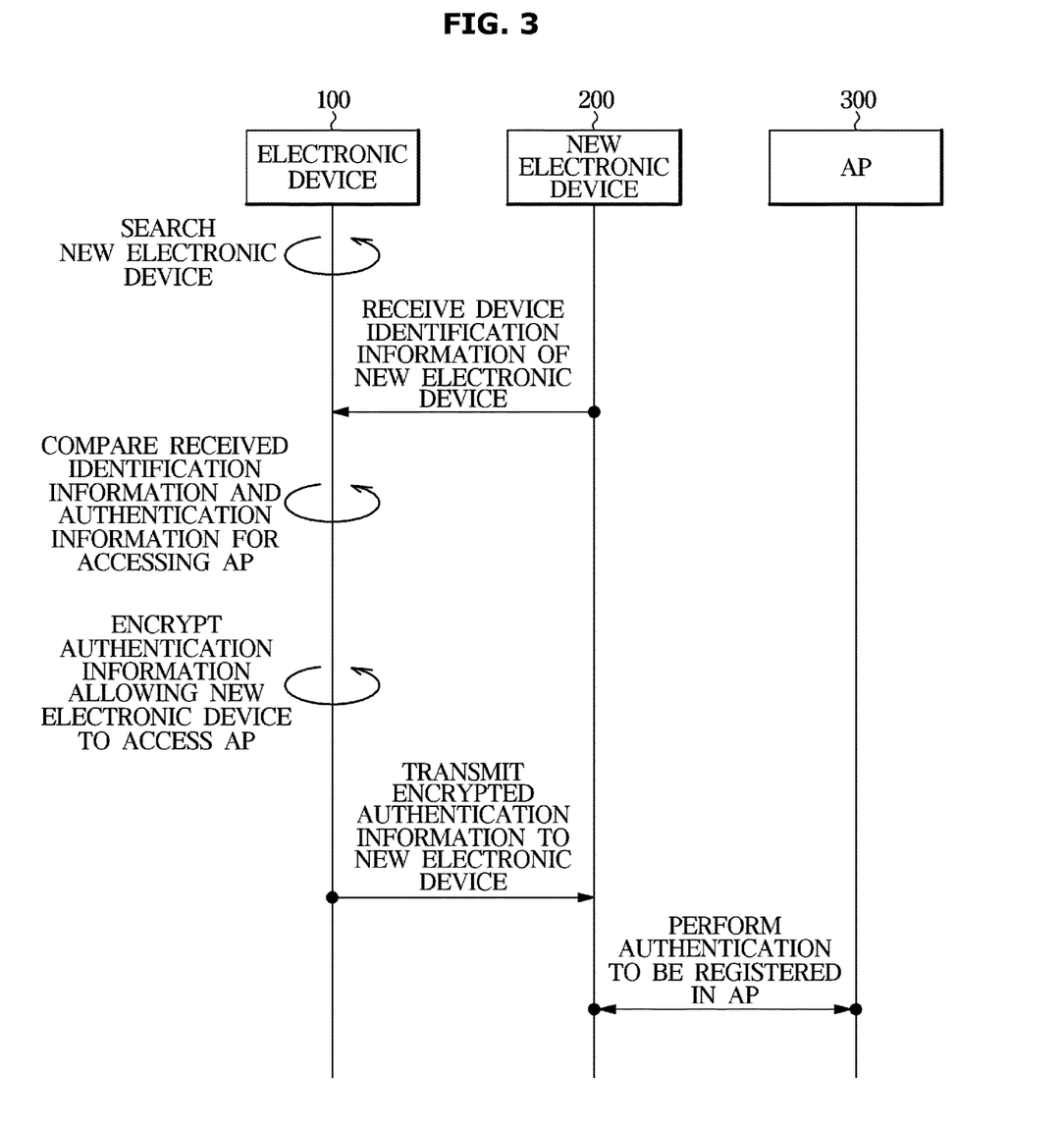
FIG. 3 is a control sequence diagram for registering a new electronic device in an access point (AP) in the home network system according to one embodiment.
Figure 4:
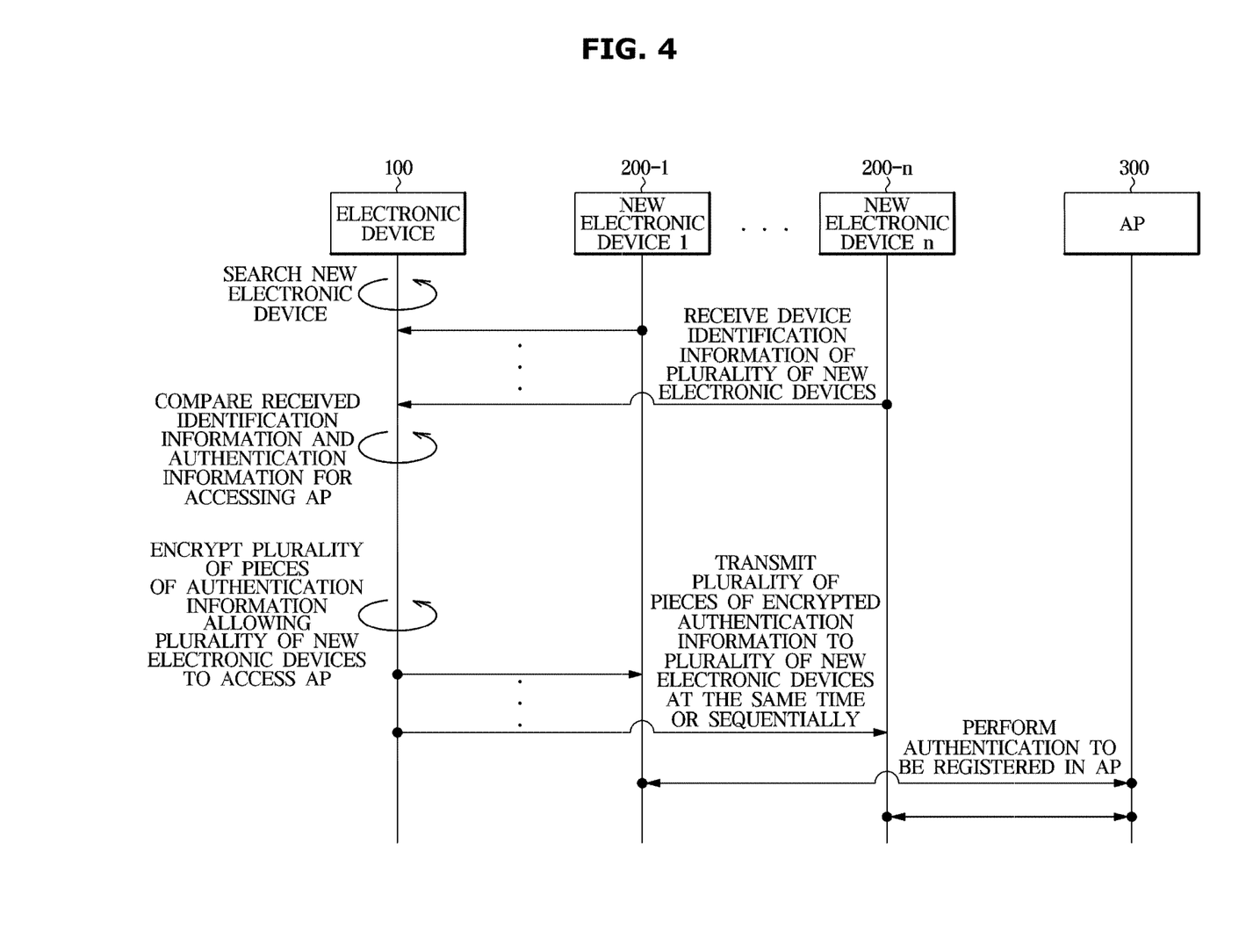
FIG. 4 is a control sequence diagram for registering a new electronic device in an AP in a home network system according to another embodiment.

FIG. 2 is a control block diagram of the electronic device according to one embodiment, FIG. 3 is a control sequence diagram for registering the new electronic device in the AP in the home network system according to one embodiment, and FIG. 4 is a control sequence diagram for registering a new electronic device in an AP in a home network system according to another embodiment.

As illustrated in FIG. 2, the electronic device 100 according to one embodiment may include a communicator 110, a controller 120, and a storage 130.

The communicator 110 may perform data communication with other electronic devices registered in the AP 300 and will also perform data communication with the new electronic device 200 which is not registered in the AP 300.

The communicator 110 may include an ultrasonic receiver module or a Bluetooth Low Energy (BLE) module and search the new electronic device 200 positioned around the electronic device 100.

In addition, the communicator 110 may communicate with a server 400 through a cloud, receive authentication information for accessing the AP 300 from the server 400, and also receive device identification information about the new electronic devices 200 added to the home network system.

According to one embodiment, the communicator 110 may be implemented as a short-range wireless communication module such as a wireless fidelity (Wi-Fi) module, a ZigBee module, a near field communication (NFC) module, an infrared data association (IrDA) communication module, a radio frequency identification (RFID) communication module, or a wireless local access network (WLAN) communication module and may perform data communication.

The controller 120 generally controls operations of the components forming the electronic device 100 according to one embodiment. Particularly, when the controller 120 receives the device identification information about the new electronic device 200 through the communicator 110, the controller 120 may control the communicator 110 so that the authentication information, which allows the new electronic device 200 to access the AP 300, is transmitted to the new electronic device 200 based on the received identification information.

The storage 130 stores the authentication information allowing the electronic devices of the home network system to access the AP 300. In this case, the authentication information is information for accessing the AP 300 and may include at least one piece among subsystem identification (SSID) information and password information. The storage 130 for storing the authentication information as described above may be implemented as at least one among storage media such as a nonvolatile memory device including a cache, a read only memory (ROM), a programmable ROM (PROM), an erasable PROM (EPROM), an electrically EPROM (EEPROM), or a flash memory, a volatile memory device such as a random access memory (RAM), a hard disk drive (HDD), or a compact disc ROM (CD-ROM) but is not limited thereto. The storage 130 may be a memory implemented as a chip separated from a processor described above in relation to the controller and may also be integrated with a processor as a single chip.

Referring to FIG. 3, the communicator 110 of the electronic device 100 registered in the AP 300 in advance may perform data communication with the new electronic device 200 which is not registered in the AP 300.

The communicator 110 may search the new electronic device 200 positioned around the electronic device 100, and in this case, whether the new electronic device 200 is an electronic device positioned around the electronic device 100 may be determined through the communicator 210 of the new electronic device 200.

That is, in a case in which the new electronic device 200 is added to the home network system in which the registered electronic device 100 is present, the communicator 110 may determine whether the new electronic device 200 is an electronic device included in the same home network system.

Meanwhile, as illustrated in FIG. 4, in a case in which a plurality of new electronic devices 200-1 to 200-n are added to the home network system, the communicator 110 may determine whether the plurality of new electronic devices 200-1 to 200-n are electronic devices included in the same home network system.

Specifically, the communicator 110 may include one of various kinds of short-range communication modules as described above and may search the new electronic device 200 positioned within a predetermined distance from the registered electronic device 100 through short-range communication with the new electronic device 200.

In addition, the communicator 110 may include an ultrasonic receiver module and search the new electronic device 200 positioned within the predetermined distance from the registered electronic device 100 based on an ultrasonic signal emitted from the new electronic device 200.

That is, the new electronic device 200 may transmit a short-range communication signal to the electronic device 100 through the communicator 210 or through an ultrasonic signal transmission module provided in the communicator 210 to allow the electronic device 100 included in the home network system to search the new electronic device 200.

Meanwhile, as illustrated in FIG. 4, the registered electronic device 100 may search the plurality of new electronic devices 200-1 to 200-n based on the short-range communication signal or ultrasonic signal adopted in the plurality of new electronic devices 200-1 to 200-n.

The controller 120 may determine whether the new electronic device 200 retrieved by the communicator 110 is positioned within the predetermined distance from the registered electronic device 100, and when the new electronic device 200 is positioned within the predetermined distance, the communicator 110 may receive the device identification information from the new electronic device 200 according to control of the controller 120.

Meanwhile, as illustrated in FIG. 4, the controller 120 may determine whether each of the plurality of new electronic devices 200-1 to 200-n retrieved by the communicator 110 is positioned within the predetermined distance from the electronic device 100, and the communicator 110 may receive the device identification information of each of the plurality of new electronic devices 200-1 to 200-n positioned within the predetermined distance from the electronic device 100 according to control of the controller 120.

In this case, when the new electronic device 200 is positioned within the predetermined distance from the registered electronic device 100, the controller 120 may transmit a signal to request the device identification information of the new electronic device 200 to the new electronic device 200, and accordingly, the new electronic device 200 may transmit the device identification information to the communicator 110.

The device identification information received from the new electronic device 200 may include at least one of address information and product information of the new electronic device 200. That is, in the case in which the new electronic device 200 is newly added to the home network system, the controller 120 of the registered electronic device 100 determines whether the new electronic device 200 satisfies a registration condition of the AP 300. In this case, the controller 120 may determine whether the new electronic device 200 satisfies the registration condition of the AP 300 based on the device identification information received from the electronic device 200.

The controller 120 may compare the device identification information received from the new electronic device 200 and the authentication information which is for accessing the AP 300 and is prestored in the storage 130, and when the new electronic device 200 matches the authentication information for accessing the AP 300, the controller 120 may control the communicator 110 to transmit the authentication information to the new electronic device 200.

Specifically, the controller 120 may determine whether the new electronic device 200 satisfies the registration condition of the AP 300 of the home network system based on the at least one of the address information and the product information received from the new electronic device 200.

That is, the storage 130 of the registered electronic device 100 may store the authentication information needed for registration in advance in the case in which the new electronic device 200 is added to the AP 300 of the home network system, and the authentication information may be information received from the server 400 or information stored in advance according to a preset value of the AP 300.

The authentication information for accessing the AP 300 may be implemented and stored in various forms, and in a case in which the address information or a serial number included in the device identification information received from the new electronic device 200 matches the authentication information, the controller 120 may determine that the new electronic device 200 satisfies the registration condition of the AP 300.

Meanwhile, as illustrated in FIG. 4, the controller 120 may compare a plurality of pieces of device identification information received from the plurality of new electronic devices 200-1 to 200-n and a plurality of pieces of authentication information, which are prestored for accessing the AP 300 in the storage 130, and when the plurality of new electronic devices 200-1 to 200-n matches the authentication information which allows the plurality of new electronic devices 200-1 to 200-n to access the AP 300, the controller 120 may control the communicator 110 to transmit the plurality of pieces of the authentication information to the plurality of new electronic devices 200.

When the device identification information received from the new electronic device 200 matches the authentication information prestored for accessing the AP 300, the controller 120 may encrypt the authentication information and control the communicator 110 to transmit the encrypted authentication information to the new electronic device 200.

That is, the controller 120 may encrypt the authentication information for accessing the AP 300 according to a predetermined encryption method or decryption method and transmit the encrypted authentication information to the new electronic device 200.

The method of encrypting the authentication information for accessing the AP 300 performed by the controller 120 may be implemented in various manners.

Meanwhile, as illustrated in FIG. 4, in the case in which the plurality of new electronic devices 200-1 to 200-n are present, the controller 120 may encrypt each of the plurality of pieces of the authentication information for accessing the AP 300 and transmit each of the pieces of the encrypted authentication information to each of the plurality of new electronic devices 200-1 to 200-n.

In addition, when the plurality of new electronic devices 200-1 to 200-n are present, the controller 120 may control the communicator 110 to transmit the plurality of pieces of the authentication information for accessing the AP 300 to the plurality of new electronic devices 200-1 to 200-n at the same time and may also control the communicator 110 to sequentially transmit the plurality of pieces of the authentication information for accessing the AP 300 thereto according to a predetermined order.

The new electronic device 200 may perform authentication to be registered in the AP 300 based on the authentication information received from the registered electronic device 100. That is, the new electronic device 200 may store the authentication information received through the communicator 210 in a storage 230, and a controller 220 controls the communicator 210 to transmit the authentication information to request the AP 300 so as to be registered in the AP 300. Accordingly, the AP 300 determines whether the authentication information received from the new electronic device 200 matches the prestored authentication information to determine whether the new electronic device 200 is to be registered.

When the new electronic device 200 is registered in the AP 300 through the above-described procedure, the new electronic device 200 may perform data communication with at least one of the registered electronic device 100 and the new electronic devices 200 through the AP 300.

FIGS. 5 to 8 are flowcharts for describing a method of controlling the electronic device according to one embodiment.

Figure 5:
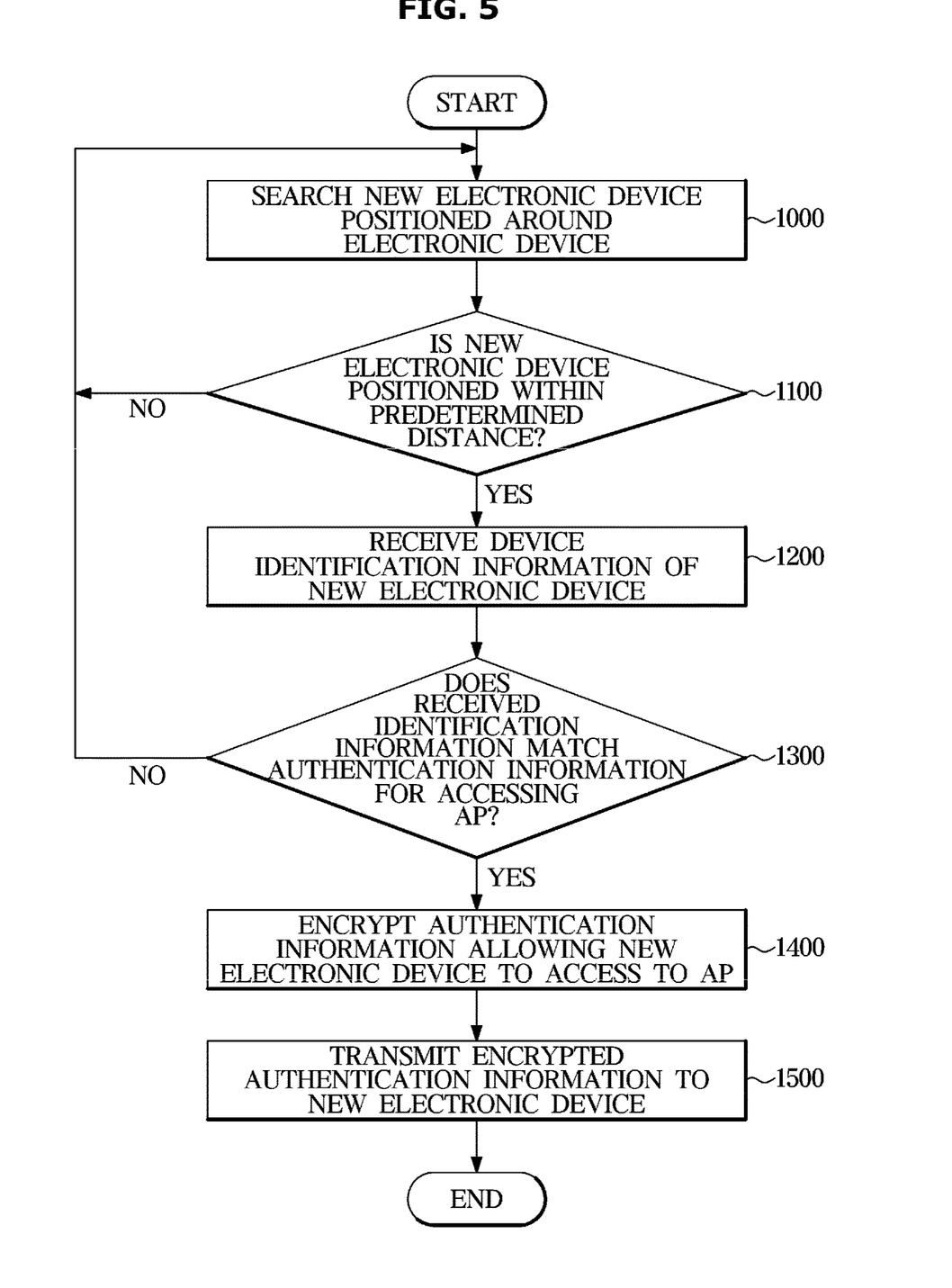
FIGS. 5, 6, 7 and 8 are flowcharts for describing a method of controlling the electronic device according to one embodiment.
Figure 6:
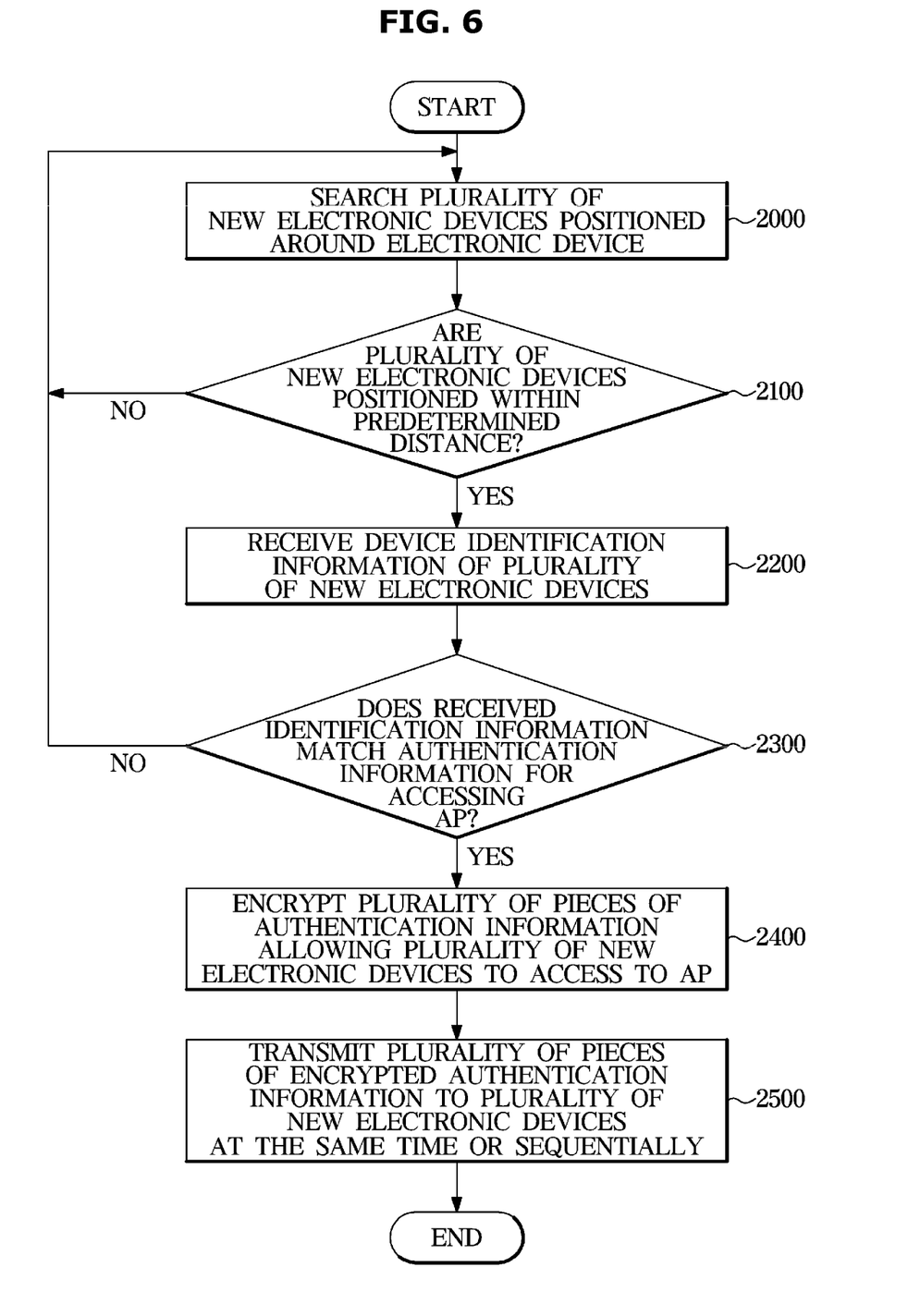

Referring to FIGS. 5 and 6, the communicator 110 of the electronic device 100 may search the new electronic device 200 positioned around the electronic device 100. In this case, as illustrated in FIG. 6, when the plurality of new electronic devices 200-1 to 200-n are added to the home network system, the communicator 110 may determine whether the plurality of new electronic devices 200-1 to 200-n are electronic devices included in the same home network system (2000).

The communicator 110 may include one of various kinds of short-range communication modules and search the new electronic device 200 positioned within a predetermined distance from the registered electronic device 100 through short-range communication with the new electronic device 200.

Figure 7:
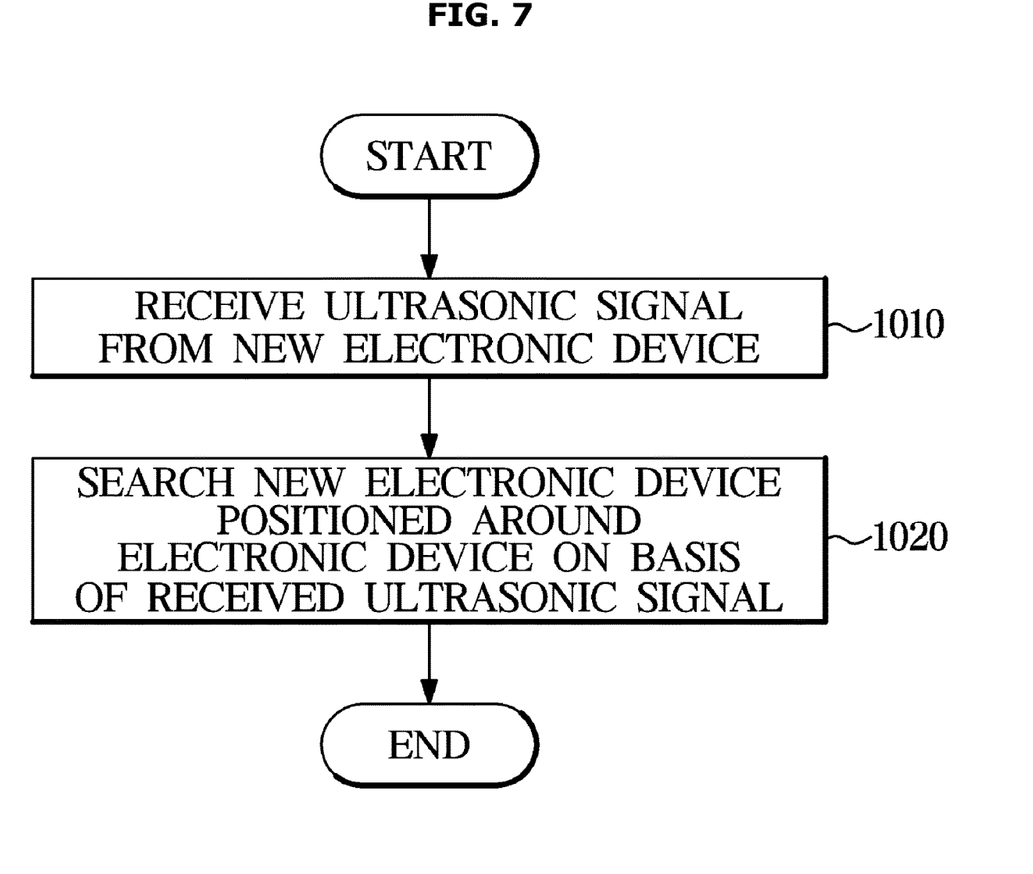
Figure 8:
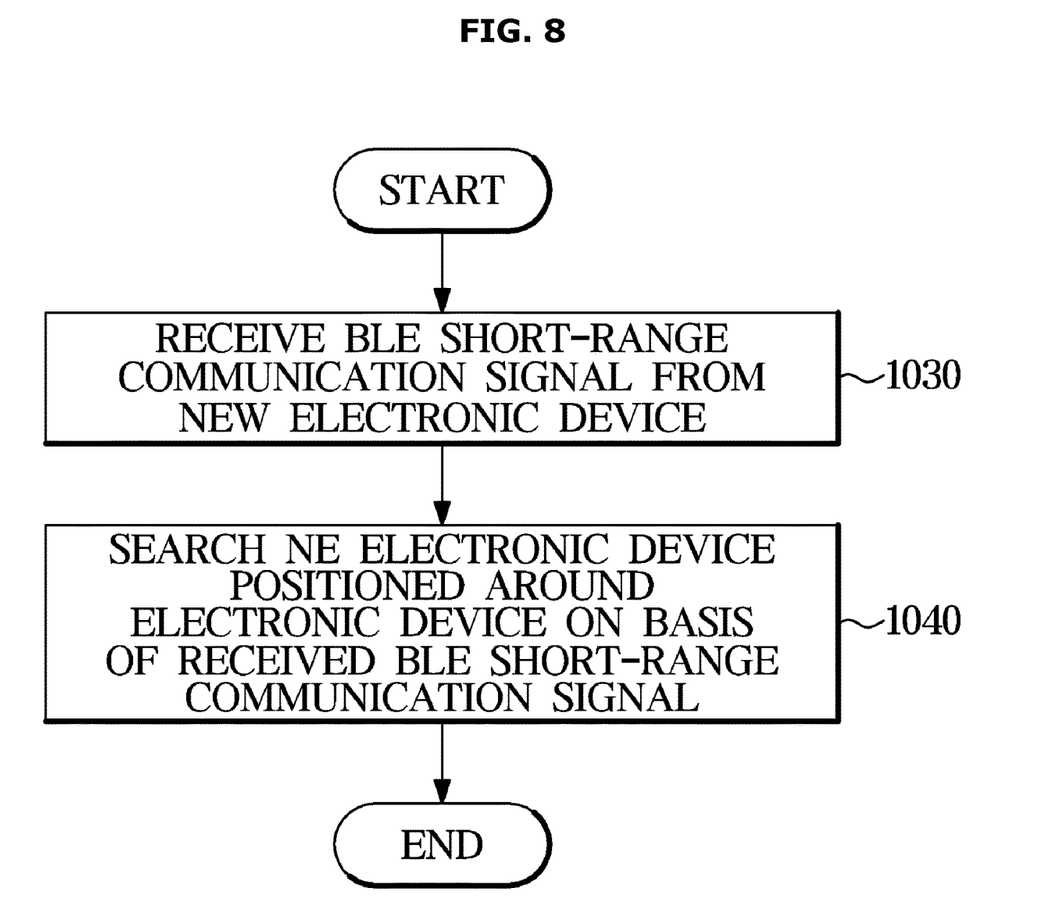

As illustrated in FIG. 7, the communicator 110 may include an ultrasonic receiver module and search the new electronic device 200 positioned around the electronic device 100 based on an ultrasonic signal 1010 received from the new electronic device 200 (1020). In addition, as illustrated in FIG. 8, the communicator 110 may include a BLE module and search the new electronic device 200 positioned around the electronic device 100 based on a BLE short-range communication signal 1030 received from the new electronic device 200 (1040).

The controller 120 may determine whether the new electronic device 200 retrieved by the communicator 110 is positioned within the predetermined distance from the registered electronic device 100 (1100), and when the new electronic device 200 is positioned within the predetermined distance, the communicator 110 may receive device identification information from the new electronic device 200 according to control of the controller 120 (1200).

Meanwhile, as illustrated in FIG. 6, the controller 120 may determine whether each of the plurality of new electronic devices 200-1 to 200-n retrieved by the communicator 110 is positioned within the predetermined distance from the electronic device 100 (2100), and the communicator 110 may receive the device identification information of each of the plurality of new electronic devices 200-1 to 200-n positioned within the predetermined distance from the electronic device 100 according to control of the controller 120 (2200).

The controller 120 may compare the device identification information received from the new electronic device 200 and authentication information prestored in the storage 130 for accessing the AP 300 (1300), and when the new electronic device 200 matches the authentication information to be registered in the AP 300, the controller 120 may encrypt the authentication information (1400) and control the communicator 110 to transmit the encrypted authentication information to the new electronic device 200 (1500).

Similarly, as illustrated in FIG. 6, the controller 120 may compare a plurality of pieces of device identification information received from the plurality of new electronic devices 200-1 to 200-n and a plurality of pieces of authentication information prestored in the storage 130 for accessing the AP 300, and when the plurality of new electronic devices 200-1 to 200-n match with the authentication information, which allows the plurality of new electronic devices 200-1 to 200-n to access the AP 300, the controller 120 may encrypt the plurality of pieces of the authentication information (2400) and control the communicator 110 to transmit the plurality of pieces of the encrypted authentication information to the plurality of new electronic devices 200-1 to 200-n (2500).

The new electronic device 200 may perform authentication to be registered in the AP 300 based on the authentication information received from the registered electronic device 100. When at least one of the new electronic devices 200-1 to 200-n is registered in the AP 300 through the above-described procedure, the new electronic devices 200-1 to 200-n may perform data communication with the registered electronic device 100 and at least one of the remaining new electronic devices 200-1 to 200-n through the AP 300.

As described above, according to the electronic device and the method of controlling the same according to one embodiment of the disclosed invention, since the electronic device 100 registered in the home network system automatically registers the new electronic device 200, which is not registered, in the AP 300, there is an effect in that various new electronic devices 200 are registered in the AP 300 at once without user manipulation.

Meanwhile, the disclosed embodiments may be implemented in the form of recording media for storing commands executable by computers. The commands may be stored in the form of program code, and when the commands are executed by a processor, program modules may be generated to perform the operations of the embodiments. The recording media may be implemented as computer-readable recording media.

The computer-readable recording media include any kind of recording media in which computer-readable commands are stored. For example, the computer-readable recording media may include a ROM, a RAM, a magnetic tape, a magnetic disk, a flash memory, and an optical data storage device.

As described above, the disclosed embodiments have been described with reference to the accompanying drawings. It will be understood by those skilled in the art that the invention may be performed in forms different from the disclosed embodiments without changing the technological spirit or essential features. Therefore, the disclosed embodiments should be interpreted as only exemplary and not for purposes of limitation.

The invention claimed is:
1. An electronic device comprising:
a first communicator configured to perform data communication with a server and a second communicator of a new electronic device which is not registered in an access point (AP);
a storage configured to store first authentication information for accessing the AP; and
a controller configured to:
upon receiving second authentication information for registering the new electronic device through the first communicator from the server, store the second authentication information in the storage,
upon receiving device identification information of the new electronic device through the first communicator from the new electronic device, compare the received identification information with the second authentication information, in response to the received identification information matching the second authentication information, control the first communicator to transmit the authentication information, which allows the new electronic device to access the AP, to the second communicator of the new electronic device, wherein the first_authentication information is stored in the storage prior to receiving the device identification information of the new electronic device.

2. The electronic device of claim 1 wherein in response to the received identification information matching the second authentication information, the controller is configured to:

encrypt the first authentication information, which allows the new electronic device to access the AP, and control the first communicator to transmit the encrypted authentication information to the new electronic device.

3. The electronic device of claim 1, wherein, in response to receiving a plurality of pieces of device identification information of a plurality of new electronic devices through the first communicator, the controller is configured to control the first communicator to transmit the first authentication information, which allow the plurality of new electronic devices to access the AP, to the plurality of new electronic devices based on the plurality of pieces of the received identification information.

4. The electronic device of claim 1, wherein in response to receiving a plurality of pieces of device identification information of a plurality of new electronic devices through the first communicator, the controller is configured to control the first communicator to sequentially transmit a plurality of pieces of authentication information, which allow the plurality of new electronic devices to access the AP, to the plurality of new electronic devices according to a predetermined order based on the plurality of pieces of the received identification information.

5. The electronic device of claim 1, wherein the first authentication information includes at least one of subsystem identification (SSID) or password information for the electronic device and the new electronic device to access the AP.

6. The electronic device of claim 1, wherein the device identification information includes at least one of address information or product information of the new electronic device.

7. The electronic device of claim 1, wherein the first communicator is configured to search for the new electronic device positioned around the electronic device; and wherein, in response to the new electronic device being positioned within a predetermined distance from the electronic device, the first communicator is configured to receive the device identification information from the new electronic device.

8. The electronic device of claim 1, wherein the first communicator includes an ultrasonic receiver module and searches for the new electronic device positioned within a predetermined distance from the electronic device based on an ultrasonic signal received from the new electronic device.

9. The electronic device of claim 1, wherein the first communicator includes a Bluetooth Low Energy (BLE) module and searches for the new electronic device positioned within a predetermined distance from the electronic device using short-range communication of the BLE module. device is an electronic device included in a same home network system.

10. A method of controlling an electronic device storing first authentication information for accessing an access point (AP), the method comprising:

upon receiving second authentication information for registering a new electronic device through from a server, storing the second authentication information;

searching for the new electronic device positioned around the electronic device;

receiving device identification information from a second communicator of the new electronic device through a first communicator when the new electronic device is positioned within a predetermined distance from the electronic device;

upon receiving the device identification information of the new electronic device from the new electronic device, comparing the received identification information with the second authentication information; and in response to the received identification information matching the second authentication information, controlling the first communicator to transmit the first authentication information, which allows the new electronic device to access the AP, to the second communicator of the new electronic device, wherein the first authentication information is stored the electronic device prior to receiving the device identification information of the new electronic device.

11. The method of claim 10, comprising, in response to receiving a plurality of pieces of device identification information of a plurality of new electronic devices through the first communicator, controlling the first communicator so that a plurality of pieces of the first authentication information, which allow the plurality of new electronic devices to access the AP, are transmitted to the plurality of new electronic devices at the same time based on the plurality of pieces of the received identification information.

12. The method of claim 10, comprising, in response to receiving a plurality of pieces of device identification information of a plurality of new electronic devices through the first communicator, controlling the first communicator so that a plurality of pieces of the first authentication information, which allow the plurality of new electronic devices to access the AP, are respectively transmitted to the plurality of new electronic devices according to a predetermined order based on the plurality of pieces of the received identification information.

13. The electronic device of claim 1, wherein the first communicator is configured to determine whether the new electronic device is an electronic device included in a same home network system by comparing the second authentication information and the received identification information.

* * * * *